US006989819B2

(12) United States Patent
Hinckley et al.

(10) Patent No.: US 6,989,819 B2
(45) Date of Patent: Jan. 24, 2006

(54) ACCELERATED DATA NAVIGATION

(75) Inventors: Kenneth P Hinckley, Seattle, WA (US); Steven N Bathiche, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 3 days.

(21) Appl. No.: 10/812,942

(22) Filed: Mar. 31, 2004

(65) Prior Publication Data
US 2004/0189600 A1 Sep. 30, 2004

Related U.S. Application Data

(63) Continuation of application No. 09/791,900, filed on Feb. 26, 2001, now Pat. No. 6,738,045.

(51) Int. Cl.
G09G 5/08 (2006.01)
(52) U.S. Cl. ........................ 345/163; 345/164
(58) Field of Classification Search ............... 345/156, 345/159, 163, 164, 167, 168, 784, 785; 715/784, 715/785
See application file for complete search history.

(56) References Cited

U.S. PATENT DOCUMENTS

| 5,179,648 | A | * | 1/1993 | Hauck | .................. 345/684 |
| 5,495,566 | A | | 2/1996 | Kwatinetz | |
| 5,530,455 | A | | 6/1996 | Gillick et al. | |
| 5,633,657 | A | | 5/1997 | Falcon | |
| 5,877,748 | A | | 3/1999 | Redlich | |
| 5,943,052 | A | | 8/1999 | Allen et al. | |
| 6,075,533 | A | | 6/2000 | Chang | |
| 6,097,371 | A | | 8/2000 | Siddiqui et al. | |
| 6,128,006 | A | | 10/2000 | Rosenberg et al. | |
| 6,198,473 | B1 | | 3/2001 | Armstrong | |
| 6,259,432 | B1 | | 7/2001 | Yamada et al. | |
| 6,310,607 | B1 | | 10/2001 | Amemiya | |
| 6,496,180 | B1 | * | 12/2002 | Hedman | ............. 345/166 |
| 6,738,045 | B2 | * | 5/2004 | Hinckley et al. | ........ 345/163 |

OTHER PUBLICATIONS

Shumin Zhai, "Human Performance in Six Degree of Freedom Input Control", 1995, 225 pages.
Andrew Sears and Ben Shneiderman, High precision touchscreens: design strategies and comparisons with a mouse, study, Int. J. Man-Machine Studies, 1991, 34, pp. 593-613, Dept. of Computer Science and Human-Computer Interaction Laboratory, University of Maryland, College Park, MD 20742.

(Continued)

Primary Examiner—Ricardo Osorio
(74) Attorney, Agent, or Firm—Banner & Witcoff, Ltd.

(57) ABSTRACT

A method and system uses an acceleration curve to enhance data navigation. In a preferred embodiment, the scrolling algorithm of an input device with a rotational member accelerates a resultant scroll amount in direct relation to a rotational speed of the rotational member. The acceleration curve may be implemented in a look-up table in the mouse driver. Different acceleration curves may be used based upon whether a user is scrolling up or scrolling down. In a further embodiment, acceleration is temporarily inhibited upon the occurrence of a change in the direction of rotation of the rotational member.

15 Claims, 5 Drawing Sheets

OTHER PUBLICATIONS

Shumin Zhai and Paul Milgram, Human Performance Evaluation of Manipulation Schemes in Virtual Environments, paper, Proc. IEEE Virtual Reality Annual International Symposium (VRAIS), Seattle, WA, Sep. 1993, Dept. of Industrial Engineering, Univ. of Toronto, Toronto, Canada M5S 1A4.

Andrew Sears, Catherine Plaisant, Ben Shneiderman, A New Era for High Precision Touchscreens, paper, Human-Computer Interaction Laboratory & Department of Computer Science, University of Maryland, Jun. 1990, pp. 1-33.

Ken Hinckley, John C. Goble, Randy Pausch, Neal F. Kassell, New Applications for the Touchscreen in 2D and 3D Medical Imaging Workstations, paper, Proc. SPIE Medical Imaging ', University of Virginia, Charlottesville, VA 22903, 10 pp.

Shumin Zhai, Barton A. Smith, Ted Selker, Improving Browsing Performance: A study of four input devices for scrolling and pointing tasks, paper, Proceedings of INTERACT97: The Sixth IFIP Conference on Human-Computer Interaction, Sydney, australia, Jul. 14-18, pp. 286-292.

Shumin Zhai, Ph.D., Human Performance in Six Degree of Freedom Input Control, thesis, Ergonomics in Teleoperation and Control Lab, Dept. of Industrial Engineering, University of Toronto, 1995, 227 pp.

George G. Robertson, Stuart K. Card, and Jock D. Mackinlay, The Cognitive Coprocessor Architecture for Interactive User Interfaces, paper, Xerox Palo Alto Research Center, 333 Coyote Hill Road, Palo Alto, CA 94304, 1989, pp. 10-18.

1. Scott Mackenzie, Input Devices and Interaction Techniques for Advanced Computing, paper, In W. Barfield, & T.A. Furness III (Eds.), Virtual environments and advanced interface design, 1995, pp. 437-470. Oxford, UK: Oxford University Press.

Herbert D. Jellinek, Stuart K. Card, Powermice and User Performance, paper, Xerox Palo Alto Research Center, 3333 Coyote Hill Road, Palo Alto, CA 94304, CHI ' Proceedings, Apr. 1990, pp. 213-220.

* cited by examiner

ACCELERATED DATA NAVIGATION

This application is a continuation of and claims priority to co-pending U.S. application Ser. No. 09/791,900, filed Feb. 26, 2001, now U.S. Pat. No. 6,738,045 entitled "Method and System for Accelerated Data Navigation".

FIELD OF THE INVENTION

The present invention relates generally to user actuated pointing devices for use with a computer. More particularly, the invention relates to enhancing the scrolling algorithm of wheeled input devices.

BACKGROUND OF THE INVENTION

The computer mouse has simplified the computer-human interface. Before the computer mouse, many users were confined to interacting with a computer through the use of a command line interface (CLI as is known in the art). The computer mouse (also commonly referred to simply as a "mouse") has, in recent years, been improved upon with the inclusion of a wheel on the top of the mouse. An example of a wheeled mouse is shown in FIG. 1. The function of the wheel 106 is to scroll the text or document or image located below a displayed cursor 113 shown on a visual display device 112. The wheel is linked to an optically encoded wheel for sensing the rotational location of the wheel 106. To allow for feedback to the user, the wheel contains a number of notches (not shown for simplicity). When rotated, a user is presented with tactile feedback of the distance rotated through sensing the number of notches rotated by the wheel. The function of the wheel 106 is interpreted through signals sent from mouse 101 through cable 110 to computer 109 having memory 114 and processor 115. Shown for completeness is keyboard 116, which is generally used in combination with mouse 101 for various operations as are known in the art. For example, rotating the wheel away from the user may scroll the underlying displayed content down so as to show another portion of the displayed content immediately preceding the originally displayed content. Likewise, rotating the wheel toward the user may scroll the underlying displayed content up.

A user may specify a scrolling mode of either scrolling by a fixed number of lines (referred to herein as the "line-scrolling mode") or scrolling by page (referred to herein as the "page-scrolling mode"). To change from one scrolling mode, or to modify the number of lines to scroll in the line-scrolling mode, a user navigates a series of windows to a preferences option list for the wheeled mouse. In general, the preferences page allows selection of the scrolling mode as well as a designation of the number of lines to scroll per notch indent when a line-scrolling mode is selected.

Other features of a wheeled mouse and alternative techniques of navigating a display through the use of the wheeled mouse are disclosed in U.S. Ser. No. 09/212,898, filed Dec. 16, 1998, for "System and Method of Adjusting Display Characteristics of a Displayable Data File Using An Ergonomic Computer Input Device." The contents of this application are hereby incorporated herein by reference.

Presently, to scroll a document or other content on a computer screen, a user may use a scrolling mechanism on an input device such as the wheel on a mouse as described above, keyboard navigation keys, or a scroll bar provided as part of a graphical user interface. In many user scenarios, the wheel on the mouse is preferred for scrolling. Scrolling through a document via the wheel on a wheeled mouse provides useful document handling without the need to access the keyboard or predefined scroll bars. A mouse wheel is, however, limited in the distance that one can quickly scroll across a document or other data file. Rolling the wheel works very well for precision (short-distance) scrolling, allowing users to finely tune to the section of the page they want visible, but this method becomes less satisfactory as document length is increased and the user needs to scroll longer distances.

For example, in a scenario where the user needs to scroll a long distance in a document using a wheeled mouse as shown in FIGS. 1A and 1B, the user would have to scroll across 22 notches of the mouse wheel per page on the default setting of 3 lines per notch. In a typical stroke, the user may go through 6 notches; therefore to scroll one whole page the user has to actuate a full stroke of the wheel four times. Scrolling more than approximately two pages may make using the scroll wheel uncomfortable and strenuous.

As a document's size changes or the needs of a user change (for example, from drafting a document to editing or reviewing a completed draft), the user may desire to change the scrolling mode. With the known wheeled mouse, changing the scrolling mode involves navigating to a mouse preferences page, switching the scrolling mode, changing (when appropriate) the number of lines to scroll with every rotational notch in the wheel, and finally returning to the underlying document. Some users may find that these steps detract from the ease of using the scrolling feature of a wheeled mouse.

Input controls typically used for scrolling are often provided with a very low input resolution. For example, one existing mouse wheel has 18 notch positions that can be sensed, i.e., one notch per every 20 degrees. (Notches are provided for tactile feedback, and are not required. Notches merely provide the user tactile feedback to determine when the user has rolled through a position on the wheel that will trigger a wheel rotation signal. One can imagine a wheel that has no notches but works the same as stated above.) Furthermore, messages from the mouse are transmitted to the operating system at a predetermined reporting rate, e.g., 100 Hz for PS/2 and 30 Hz for serial (USB) mice. Thus, if considered as a sensor which ideally would detect the exact actual rotation imparted by the user's finger, the wheel mechanism actually suffers from significant quantization effects both for the sensed angle (20 degree increments) and the sensed time at which the wheel arrived at that angle. As a result, modification of the device's control-to-display ratio can have a significant effect on the user's performance.

The inventors are not presently aware of a variable gain factor adjustment technique that has been optimized for low resolution input devices and Microsoft Windows operating systems. One known technique, implemented on Apple MacIntosh computers, uses only two scroll modes. The technique apparently moves the screen in increments of one full page when the user rolls the wheel quickly, but moves a single line at a time when the user rolls the wheel slowly. In addition to its operational limitations, it is difficult to implement this technique on a Windows-based system because of the architecture of the Windows mouse system. Other known techniques for "accelerating" input device control/gain ratios in response to the user's input gesture do not give satisfactory results when scrolling a document using a wheel or other low resolution input mechanism.

Accordingly, a more efficient technique for providing accelerated scrolling would be desirable, particularly one that could be optimized for low resolution input devices using Microsoft Windows operating systems.

BRIEF SUMMARY OF THE INVENTION

In a first aspect of the invention, there is a system for controlling navigation of a data file. An input device has a user-actuated input mechanism. A detecting device or arrangement detects the rate of user-actuation of the input mechanism. A determination device or arrangement determines a data file navigation rate based on an increasing function of the rate of user-actuation. An output device or arrangement outputs control signals indicative of the navigation rate.

In a second aspect, the invention is directed to a method for controlling navigation of a data file. A user-actuation rate of a mechanism on an input device is detected. A data file navigation rate is determined as an increasing function of the user-actuation rate. Control signals indicative of the data file navigation rate are provided as output.

In a preferred embodiment, the system and method of the invention utilize the exponential function $\Delta y = C + K_1 (1 + K_2 \Delta t)^\alpha$, where $\Delta y$ is the navigation rate, C is a constant, $K_1$ and $K_2$ are gain factors, $\alpha$ is a non-linear parameter, and $\Delta t$ is an indication of the rate of user actuation.

In addition, in a preferred system and method of the invention, the navigation comprises scrolling a display, the user actuation includes rotation of a rotational member and the data file navigation rate is a scroll rate.

The above and other aspects, features and advantages of the present invention will be readily apparent and fully understood from the following detailed description of preferred embodiments, taken in conjunction with the appended drawings.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

To address the shortcomings of known scrolling devices as noted above, the inventors have designed an accelerated scrolling control that, in a sense, may be thought of as an automatic transmission for a mouse wheel or other user input device that may be used for scrolling or other data file navigation. In a wheeled mouse scrolling implementation, the system can adjust the control-to-display ratio between input and apparent motion on the screen based on how quickly a user turns the wheel. Accelerated scrolling increases the number of scroll messages based on the time difference between scroll events (e.g., notch clicks). The faster a user scrolls, the smaller the time difference between scroll messages. The scrolling algorithm measures this time difference and applies a corresponding gain. The smaller the time difference, the larger the gain. For example, in a slow stroke of a mouse wheel the time difference between notch clicks is larger compared to a fast stroke of the wheel. Just as importantly, when the user does not scroll fast, the scrolling control may revert to sending a single scroll message per wheel notch, thus allowing the wheel to maintain precision for scrolling short distances.

While the invention is described primarily in relation to accelerating scrolling through a text document, it will be appreciated that any data content may be navigated including, but not limited to, pages from the Internet, images, spreadsheets, calendars, and the like. Also, scrolling can include navigation of non-viewable media, including moving forward and backward through audio, video, and multimedia data files. Still further, the invention may be applied to other data file navigation functionality such as "zoom" features for zooming in and out on an image file or the like. The invention may be implemented using C. It will be appreciated that versions of other languages may be used, including C++, C#, Visual Basic, assembly language, and the like. Any programming language that can produce a computer-executable algorithm following the steps of the invention may be used. While the invention is described primarily in relation to a wheeled mouse providing a scrolling functionality, it will be appreciated that the invention is applicable to various other input devices providing a scrolling functionality, e.g., any computer or computer peripheral equipped with a scrolling wheel, such as a keyboard, trackball, stylus, tablet, joystick or game pad, hand-held or tablet computer, and other common devices familiar to those skilled in the art. The invention may also be applied to other low-resolution sensors that can be operated in a method analogous to a scrolling wheel, such as a low-resolution touch pad with a series of contact sensors that the user strokes their finger across, or a sensed moveable treadmill, similar to a tank tread that you push with your finger.

Figure 1A:
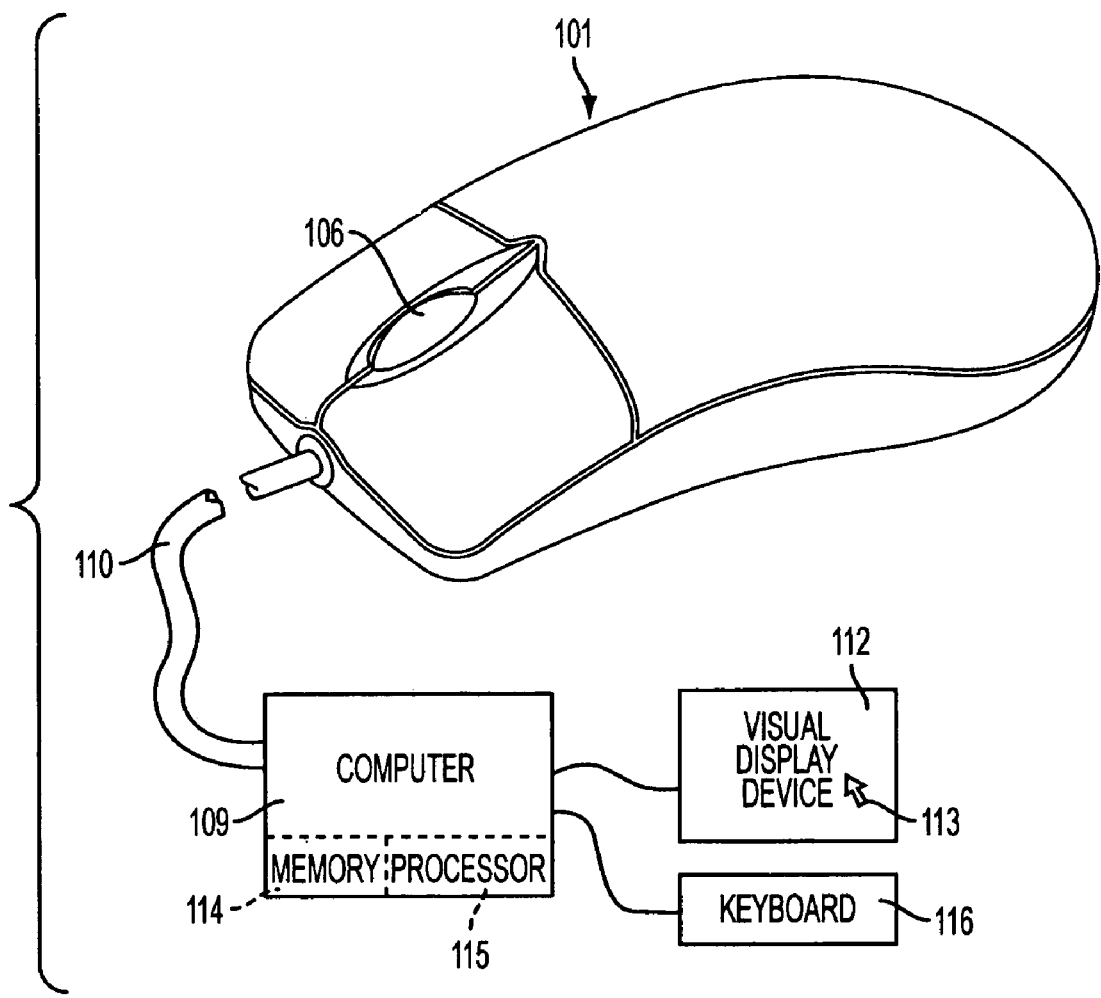
FIG. 1A is a perspective view of a mouse having a wheel, together with a diagrammatic representation of associated computer system components.
Figure 1B:
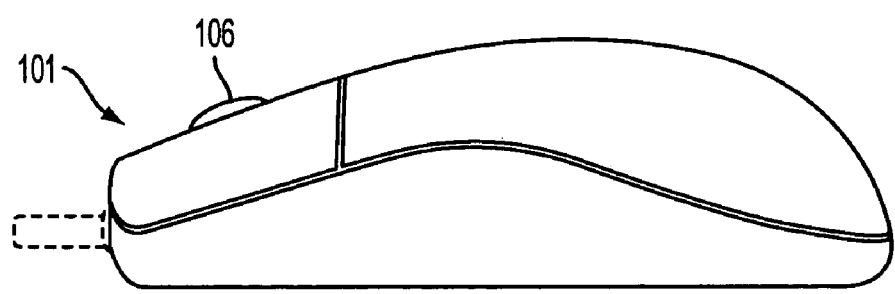
FIG. 1B is a side elevational view of the mouse shown in FIG. 1A.

A known wheeled computer mouse as shown in FIG. 1 may be used in connection with the present invention. In general, the distance scrolled through a document depends on the speed of rotation of the wheel 106. The rotational speed of the wheel may be determined by known means such as an optical encoder assembly. In some embodiments the wheel may contain notches through which tactile feedback is provided to a user to assist the user in determining how far the user has rotated the wheel. When the wheel is rotated slowly, the elapsed time since the last notch indent will be relatively high. In accordance with the present invention, under these circumstances, the resulting scroll rate may be a predetermined user-selectable scroll rate such as one line per notch indent or three lines per notch indent. When the wheel is rotated at greater speeds, the elapsed time between notch indents will decrease. In accordance with the present invention, scrolling may be accelerated under these circumstances in direct relation to the rotational speed of the wheel.

Figure 2A:
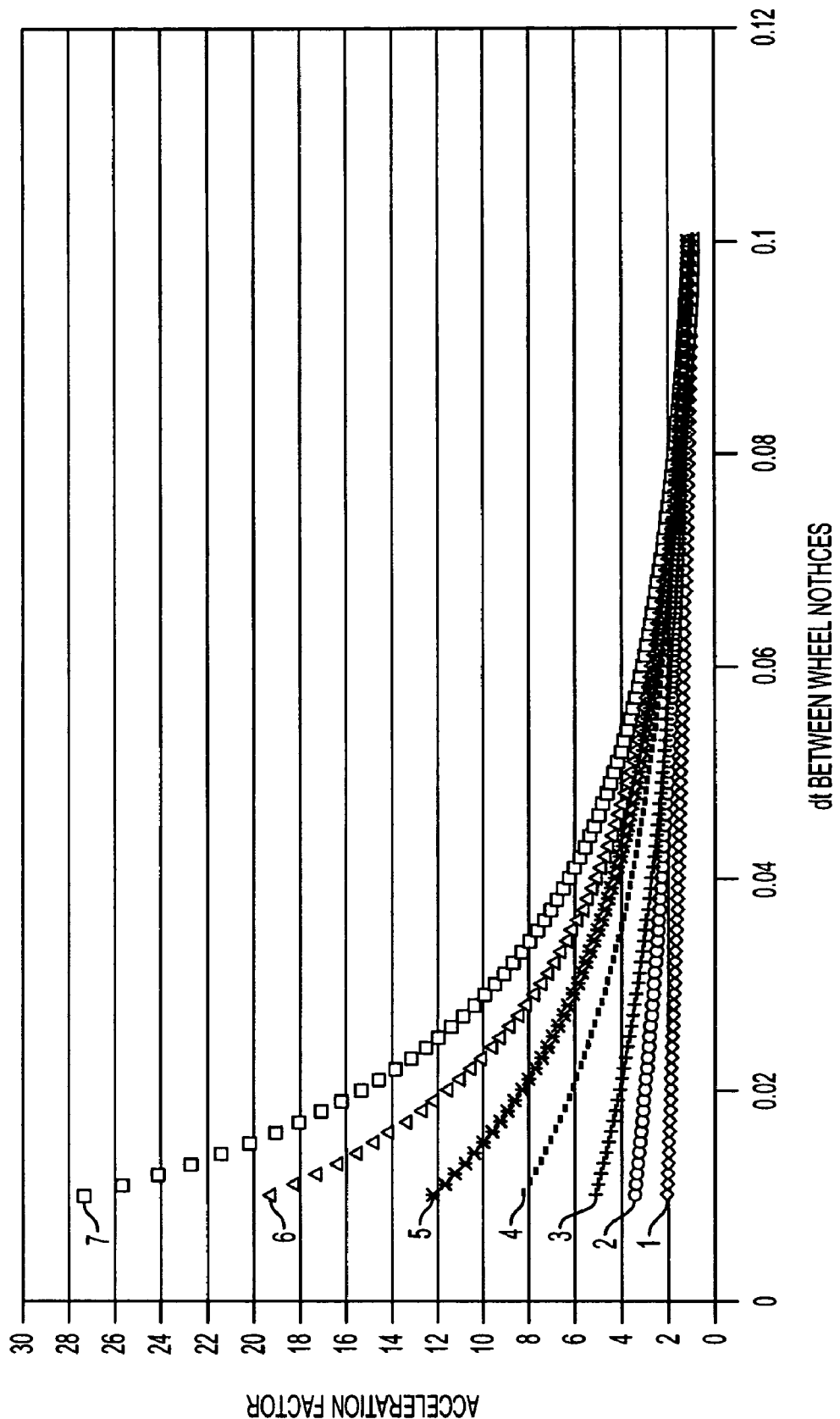
FIG. 2A is a graph showing a family of acceleration curves in accordance with an embodiment of the invention.

The accelerated scrolling of the present invention is preferably implemented based upon acceleration curves similar to any of the family of acceleration curves shown in FIG. 2A. Each of these curves may be used to determine a continuously variable scroll rate based on the speed of the user's actuation of an input mechanism, e.g., rotation of a mouse wheel (or other rotational member). While various acceleration curves are possible, acceleration curves which meet the following criteria are believed to provide the most intuitive and desirable accelerated scrolling characteristics: 1) acceleration should begin when the rotational speed is greater than approximately twenty degrees (or one notch indent on a Microsoft IntelliMouse) per one-tenth of a second. Notches separated by more than one tenth of a second are preferably treated as discrete, single scrolling events without scrolling acceleration (as on a traditional system); 2) acceleration should occur gradually enough so that the user can visually track the document without perceptible jumps (that may be desorienting); and 3) one rapid stroke of the wheel should scroll approximately one full screen It is from working within these design criteria that the inventors developed the exponential acceleration curves shown in FIG. 2A, which may be expressed mathematically as:

$$\Delta y = C + K_1(1 + K_2 \Delta t)^\alpha \quad \text{(Equation 1)}$$

In Equation 1, $\Delta y$ is the resulting scroll acceleration factor, $\Delta t$ is the time (measured in seconds) between notch indents, C is a constant to adjust the baseline of the curve, $K_1$ is a first gain factor, $K_2$ is a second gain factor applied to $\Delta t$, and $\alpha$ is the nonlinear (exponential) parameter. Insofar as applicants are aware, exponential functions have previously been used to accelerate mouse cursor movements, but not for controlling scrolling. A range of values may be used to generate a family of acceleration curves producing differing amounts of acceleration, depending on a user's preference. The ranges of values $75 >= K_1 >= 2$, $30 >= K_2 >= 3$, and $-2 >= \alpha >= -5$ are believed to produce a suitable family of curves. The values used to produce the curses in FIG. 2A are as follows:

| Curve | $K_1$ | $K_2$ | Alpha | C |
|---|---|---|---|---|
| 1 | 2.3 | 3 | −3 | 0 |
| 2 | 4 | 5 | −3 | 0 |
| 3 | 6.5 | 8.5 | −3 | 0 |
| 4 | 11.5 | 12 | −3 | 0 |
| 5 | 19 | 16 | −3 | 0 |
| 6 | 36 | 23 | −3 | 0 |
| 7 | 56 | 27 | −3 | 0 |

The most appropriate values for any given application will depend on various factors including the type of device used, the scrolling resolution of the device used, the refresh rate of the configuration, and the expected gain of the device. For instance, devices with higher resolution will require values that produce acceleration for smaller $\Delta t$ values because the notch indents are closer together.

The resultant scroll rate is preferably arrived at by adjusting the number of lines to scroll per scroll event. This can be accomplished by adjusting either the number of lines to scroll per scroll message, or by adjusting the number of scroll messages to be executed per scroll event. Because the scroll amount per notch indent may be user-selectable, as described in the Background, a system with a wheeled mouse may scroll one line per notch indent, three lines per notch indent, or some other user selected number of lines per notch indent. In this specification, it is assumed that the number of lines to scroll per notch indent is one. However, it should be apparent to those skilled in the art that other values may be used.

Figure 2B:
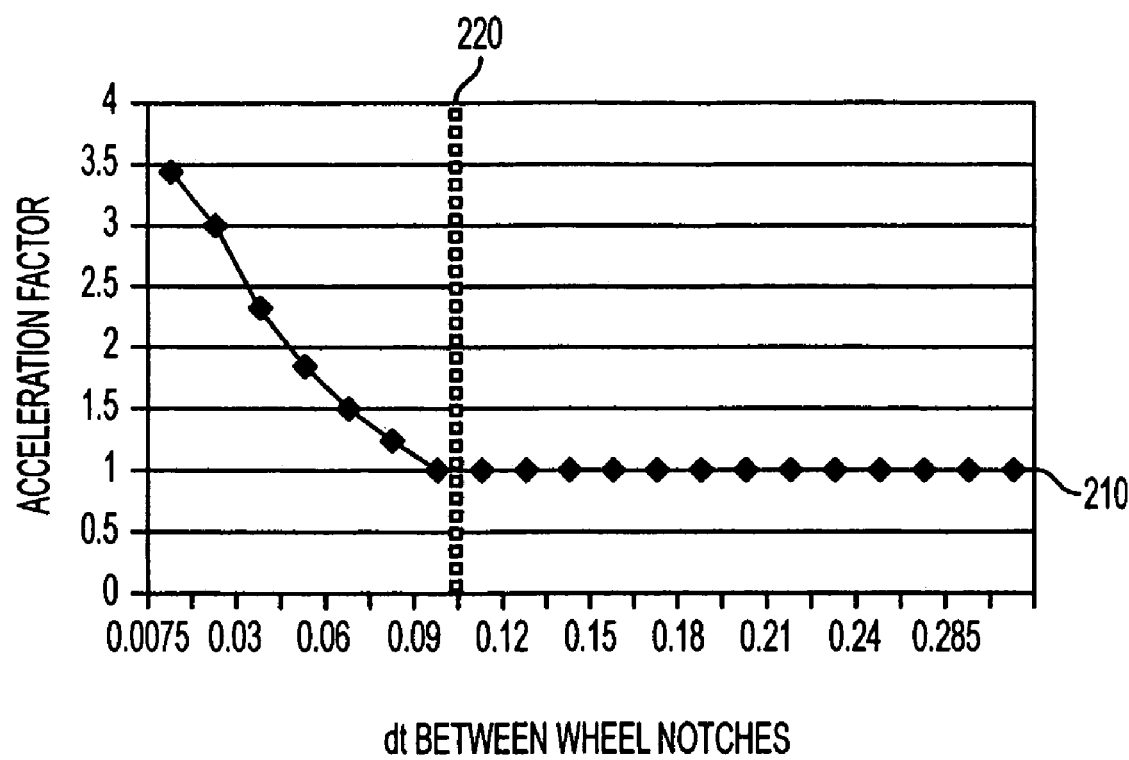
FIG. 2B is a graph showing an acceleration curve rounded up in accordance with an embodiment of the invention.

In some embodiments, as shown in FIG. 2B, if the rotational speed produces a scroll rate of less than one line per notch indent, the scroll rate may be rounded up to one line per notch indent. That is, all resultant scroll rates that would otherwise be below line 210 are rounded up to one line per notch indent to produce the acceleration curve shown in FIG. 2B. Thus, all points to the right of line 220 are rounded up to one, and all points to the left of 220 are accelerated based upon the curve.

The same acceleration curve may be used for both scrolling up ("up-scrolling") and scrolling down ("down-scrolling"). However, many users find up-scrolling more difficult than down-scrolling. Thus, in one embodiment of the invention, to accommodate the difficulties associated with up-scrolling, the values for C, $K_1$, $K_2$, and $\alpha$ used for up-scrolling are set to be different than the values used for down-scrolling. It has been found desirable to modify the values of $K_1$, $K_2$, $\alpha$ and C so as to increase the scrolling rate by approximately 20% in up-scrolling as compared to down scrolling. For example, the values C=0.67, $K_1$=5, $K_2$=9, and $\alpha$=−4.5 have been found to provide suitable results during up-scrolling, based on a down-scrolling curve using the values C=0, $K_1$=4, $K_2$=8, and $\alpha$=−2.5.

The system may be set-up to permit the user to select an acceleration curve from a family of acceleration curves, e.g., those shown in FIG. 2A, that would produce low, medium, or high acceleration rates, depending on the user's preferences.

Initial performance tests of the inventive accelerated scrolling system suggest that user performance is unaffected for short scrolling distances, is 15% faster when scrolling medium distances, and is approximately 200% faster when scrolling longer distances. Timed testing was utilized to measure performance based upon how quickly users accomplished particular tasks. On average, when using accelerated scrolling, the mean rotational speed of the wheel was observed to be slower, and rotational speeds were distributed over a wider range, than when scrolling without accelerated scrolling. This suggests there may be a biomechanical advantage to using accelerated scrolling by slowing the speed of repetitive finger motions.

In many software applications, spinning a mouse wheel or the like may perform functions other than scrolling. For example, holding down the CTRL key on a conventional keyboard while rolling the wheel causes many applications to zoom in on a document, rather than scroll. Acceleration may be applied in such circumstances. In some embodiments, it may be desirable to provide means for disabling acceleration when the wheel or other rotational member is to perform a function other than scrolling.

Figure 3:
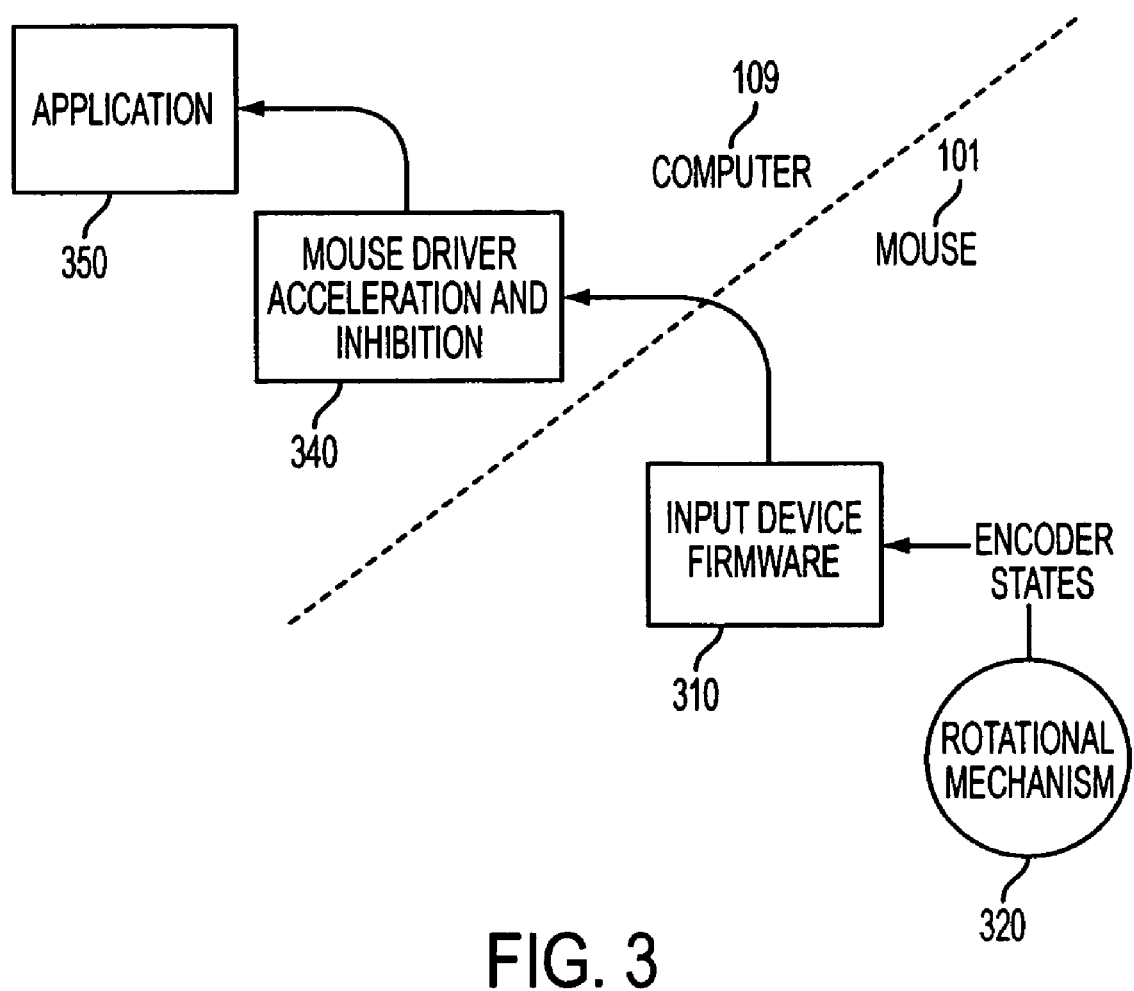
FIG. 3 is a diagrammatic depiction of a mouse driver implementation of the present invention.

Acceleration may be optimally implemented in a mouse driver as shown in FIG. 3. In another embodiment, acceleration is implemented in the device firmware 310. It is also possible to implement the invention at the application level. That is, individual software applications may incorporate the inventive scrolling modes on a selective basis. However, it is preferable to implement the scrolling modes in the driver or device firmware to prevent software developers from being required to update each of their software applications. The illustrated system includes an input device such as a mouse 101, and a computer 109. The input device includes firmware 310 and a navigation input component 320, such as a wheeled mouse or trackball, or a touchpad. The computer 109 includes an input device driver 340 and application software 350. The driver 340 detects the time between scroll events (e.g., rotation of the wheel an amount corresponding to a notch click) received from the device firmware 310. The driver applies the previously described acceleration curve (see FIG. 2) by multiplying the number of scroll events by an acceleration factor $\Delta y \geq 1$ computed with Equation 1. The driver then provides the accelerated scrolling information to the application software. To avoid floating point mathematical operation, the curve can be implemented by way of a look-up table. A look-up table can also avoid the need for processor intensive exponential operations to be carried out in the mouse driver. In many computer systems, it is necessary to use fixed-point computation techniques in the mouse driver because floating-point operations are not available at the driver's security ring.

In accordance with the invention, the driver can enforce a rounding-up of the scrolling amount to an integer number of lines. Alternatively, accelerated scrolling using fractional lines of display may be allowed. Some applications may only support scrolling by increments of a single display line or other integer amounts.

With conventional scrolling, when a user overshoots an intended location in a document, a common reaction is to quickly reverse scroll, i.e., scroll in the opposite direction. Scrolling acceleration may cause the user to again overshoot the intended location in the reverse direction, because the user's reaction to the initial overshoot may, in effect, be amplified by the acceleration. To address this potential problem, in the embodiment of the invention shown in the flowchart of FIG. 4, inhibition is used to momentarily inhibit acceleration upon occurrence of a sudden change in direction of wheel rotation. Using an inhibition timer, acceleration is prevented for a predetermined amount of time upon detection of a change in the direction of wheel rotation. An inhibition time of approximately 200–500 ms has been found to be useful. However, the inhibition timer may be set to any amount of time. Inhibition after a direction change can be implemented using a simple state machine in the device driver or firmware, as described below.

Figure 4:
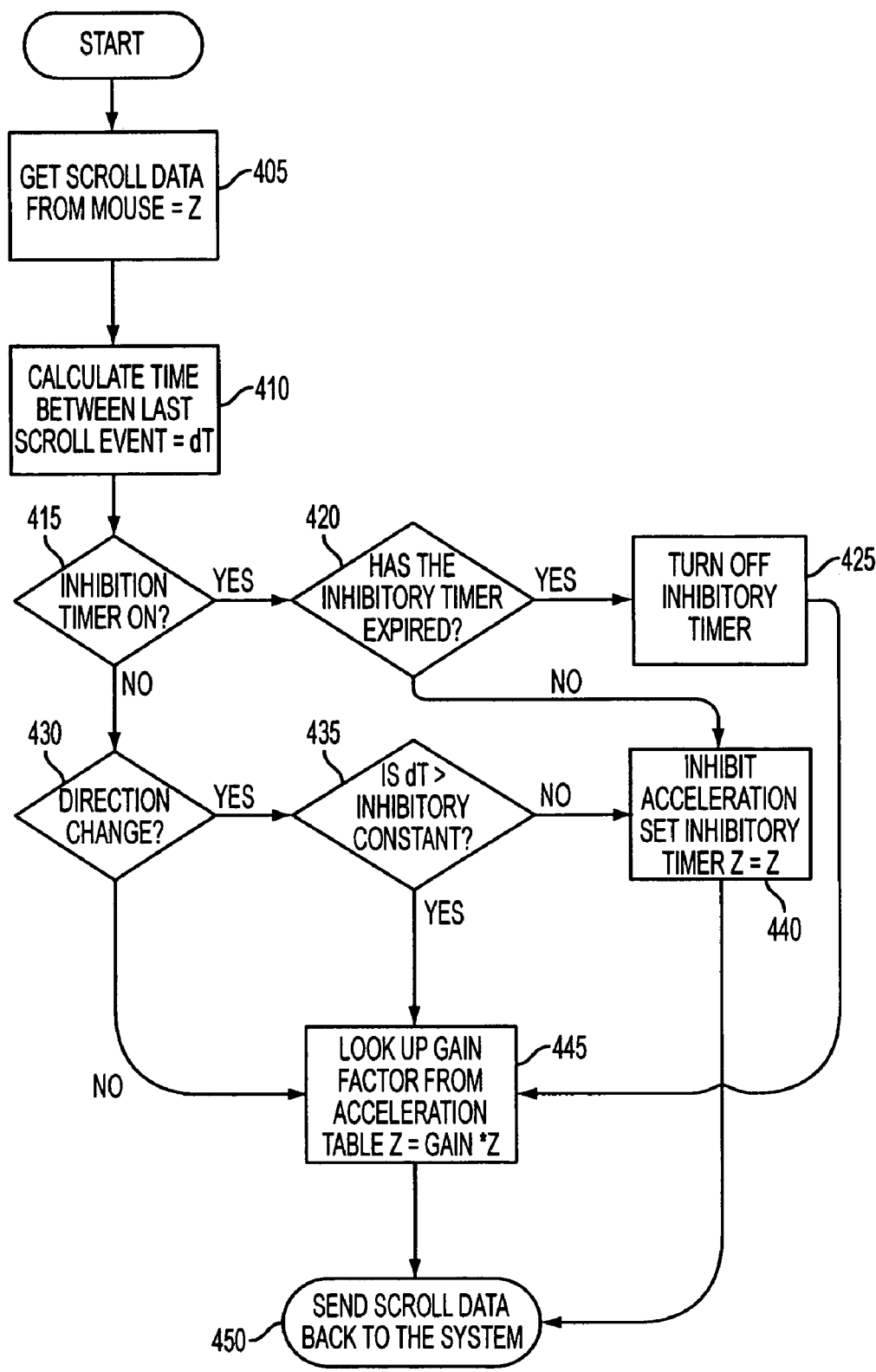
FIG. 4 is a control flowchart showing process steps for determining inhibition of acceleration in accordance with the present invention.

Referring to FIG. 4, scroll data from the wheeled input device is received in step 405. After receiving the scroll data, the system calculates in step 410, the time Δt between the last scroll event (e.g., notch click) and the present scroll event. In step 415, the system determines whether the inhibition timer is on as a result of a previous direction change. If the inhibition timer is on, control proceeds to step 420. If the inhibition timer is off, control proceeds to step 430. In step 420, the system checks to determine whether the inhibition timer has expired. That is, the system determines whether an elapsed time is greater than a preset inhibitory constant. If the elapsed time is greater than the inhibitory constant, the inhibition timer is turned off in step 425. If the elapsed time does not exceed the inhibitory constant, the system inhibits acceleration in step 440, and outputs the scroll data (without any acceleration) in step 450.

If the system determines that the inhibition timer is off in step 415, the system checks whether there has been a direction change in step 430. If there has been a direction change, the system checks, in step 435, whether the elapsed time between the last scroll event and the present scroll event is greater than the inhibitory constant. As will become apparent, this is done so that acceleration is not inhibited when the user changes scrolling direction after longer periods of time, such as after a user scrolls to a location in a document, reads for a few seconds/minutes, then scrolls quickly back up to the beginning of the document.

If the result in step 435 is that the elapsed time is less than the inhibitory constant, the system inhibits acceleration in step 440 and outputs the inhibited scroll data in step 450. If, however, the elapsed time is equal to or greater than the inhibitory constant, the system looks up the resulting scroll rate in the look-up table in step 445, and outputs the accelerated scroll data in step 450. If the system determines, in step 430, that no direction change has occurred, the system looks up the resulting scroll rate in the look-up table in step 445, and outputs the resulting scroll data in step 450.

It should be appreciated by those skilled in the art that modifications may be made, or various methods or systems may be used, which are within the scope and spirit of the present invention as defined in the appended claims.

What is claimed is:

1. A system for controlling navigation of a data file, comprising:
    an input device having a user-actuated rotational input mechanism for generating signals representative of input events, wherein said user-actuated rotational input mechanism comprises a rotational member
    detection means for detecting a rate of user actuation of said mechanism, wherein said rate of user actuation comprises a rotational speed of said rotational member;
    determination means for determining a data file navigation rate representing a navigation amount per input event as an increasing exponential function of the detected rate of user actuation; and
    output means for outputting control signals indicative of said navigation rate,
    wherein the system is adapted to monitor a direction of rotational member, and when the direction of rotation of the rotational member changes the scroll rate is fixed at a default value for a predetermined amount of time.

2. The system of claim 1, wherein said determination means rounds the data file navigation rate up to a predetermined level when the data file navigation rate would otherwise be less than the predetermined level.

3. The system according to claim 1, wherein said rotational member comprises a wheel.

4. The system according to claim 1, wherein a first exponential function is used when scrolling in a first direction and a second exponential function, different from said first exponential function, is used when scrolling in a second direction.

5. The system of claim 1, wherein the increasing exponential function produces at least three data file navigation rates based on different detected rates of user actuation.

6. A method for controlling navigation of a data file, comprising the steps of:
    detecting a rate of user actuation of a user-actuated rotational input mechanism that generates signals representative of input events on an input device;
    determining a data file navigation rate representing a navigation amount per input event as an increasing exponential function of the detected rate of user actuation, wherein said rate of user actuation is a rotational speed of said rotational member, and wherein said data file navigation rate comprises a scroll rate;
    outputting control signals indicative of said navigation rate,
    rounding the data file navigation rate up to a predetermined level when the data file navigational rate would otherwise be less than the predetermined level,
    monitoring a direction of rotation of the rotational member; and
    fixing the scroll rate at a default value for a predetermined amount of time when the direction of rotation of the rotational member changes.

7. The method of claim 6, wherein said rotational member comprises a wheel.

8. The method of claim 6, wherein a first exponential function is used when scrolling in a first direction and a second exponential function, different from said first exponential function, is used when scrolling in a second direction.

9. A computer readable medium storing computer readable instructions that perform the method of claim 6.

10. The method of claim 6, wherein the increasing exponential function produces at least three data file navigation rates based on different detected rates of user actuation.

11. A method for controlling scrolling of a display of a data processing system, comprising:
   detecting a current rate of user actuation of a scroll wheel input mechanism that generates signals causing the data processing system to scroll information displayed on the display, said detecting comprising steps of:
      receiving a first scroll event resulting from user actuation of the scroll control input mechanism;
      receiving an immediate next scroll event resulting from user actuation of the scroll control input mechanism; and
      determining an amount of time lapsed between the first and next scroll events,
   determining a scroll rate representing a navigation amount based on the amount of time as an increasing exponential function of the detected rate of user actuation;
   monitoring a direction of rotation of the scroll wheel; and
   when the direction of rotation of the scroll wheel changes, fixing the scroll rate at a default value for a predetermined amount of time.

12. The method of claim 11, wherein the determining the scroll rate step comprises rounding the scroll rate up to a predetermined level when the scroll rate would otherwise be less than the predetermined level.

13. The method according to claim 11, further comprising:
   using a first exponential function when actuating the scroll wheel input mechanism in a first direction and using a second exponential function, different from said first function, when actuating the scroll wheel input mechanism in a second direction.

14. A computer readable medium storing computer readable instructions that, when executed by a processor, perform the method of claim 11.

15. The method of claim 11, wherein the increasing exponential function produces at least three scroll rates based on different rates of user actuation.

* * * * *

UNITED STATES PATENT AND TRADEMARK OFFICE
CERTIFICATE OF CORRECTION

PATENT NO. : 6,989,819 B2
APPLICATION NO. : 10/812942
DATED : January 24, 2006
INVENTOR(S) : Kenneth P. Hinckley et al.

Page 1 of 1

It is certified that error appears in the above-identified patent and that said Letters Patent is hereby corrected as shown below:

On page 2, in item (56), under "Other Publications" in column 2, line 1, delete "australia" and insert -- Australia --, therefor.

In column 5, line 10, delete "desorienting" and insert -- disorienting --, therefor.

In column 5, line 12, after "screen" insert -- of information. --.

In column 5, line 31, delete "curses" and insert -- curves --, therefor.

In column 8, line 14, in Claim 1, after "member" insert -- ; --.

In column 8, line 25, in Claim 1, after "direction of" insert -- rotation of the --.

In column 8, line 57, in Claim 6, delete "navigational" and insert -- navigation --, therefor.

Signed and Sealed this

Eighteenth Day of August, 2009

David J. Kappos
*Director of the United States Patent and Trademark Office*